United States Patent Office 3,276,206
Patented Oct. 4, 1966

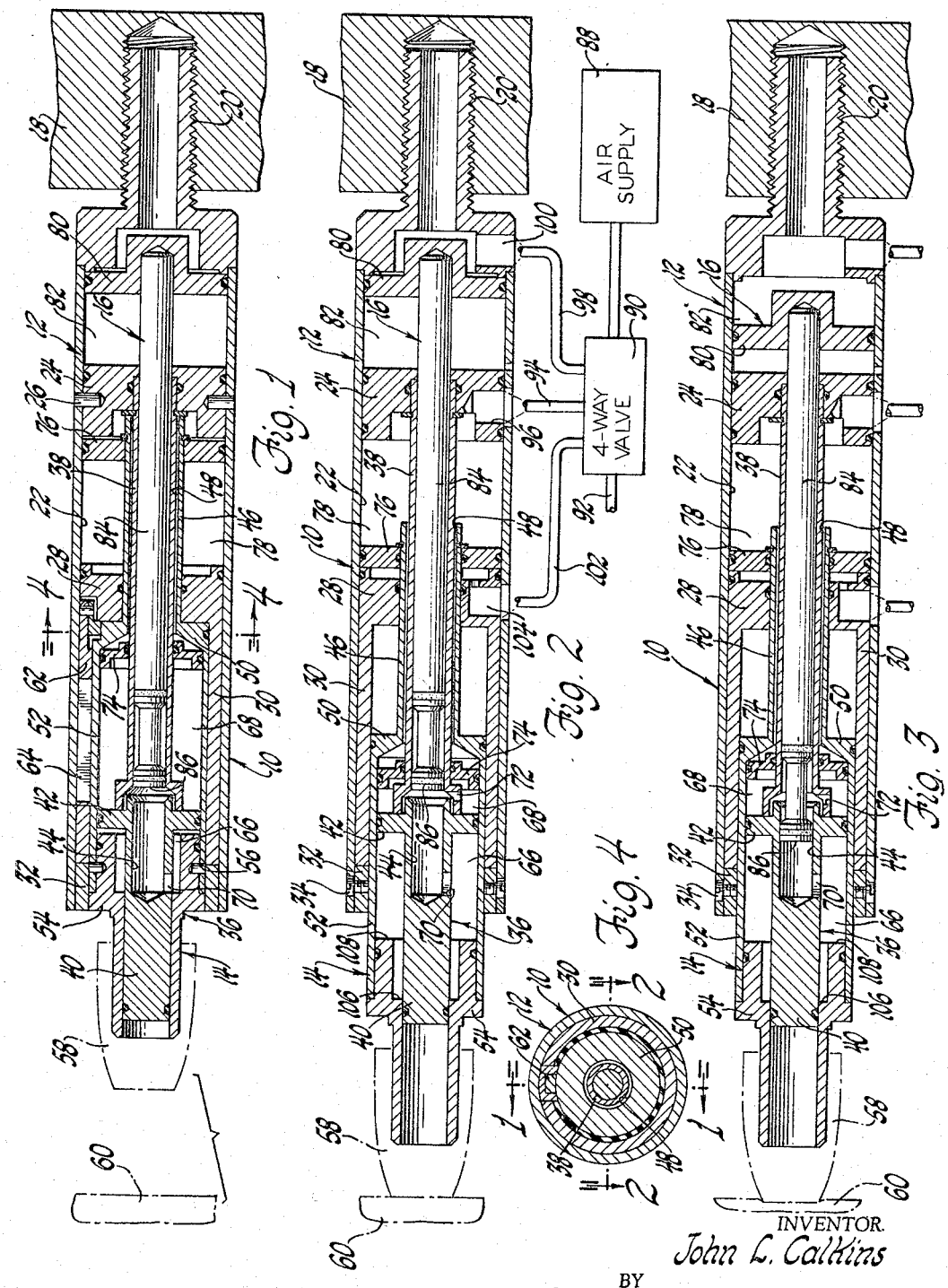

3,276,206
PRESSURE INTENSIFIER MECHANISM
John L. Calkins, 5227 Gerald, Warren, Mich.; Dolores Calkins, executor of said John L. Calkins, deceased
Filed June 10, 1963, Ser. No. 286,727
15 Claims. (Cl. 60—54.5)

This invention relates to a pressure intensifier mechanism and, in particular, to such a mechanism comprising a pair of relatively reciprocable fluid pressure actuated members sequentially and selectively operable in stages to first move one of such members, including a pressure applying head, into initial engagement with a workpiece or other member to which pressure is desired to be applied, followed by movement of the other member through a relatively short distance to apply the desired pressure to the one member and, through the head of the latter, to the workpiece or the like.

The present invention has resulted from consideration of certain problems in the tool art, such as high speed welding tools. Therefore, in order to facilitate an understanding of and not to obscure the invention, specific reference will be made hereinafter to such problems as they occur in the welding art. However, and as will become readily apparent as the description proceeds, the present invention may be utilized to advantage with respect to other tools and other arts in which it is desirable to selectively apply pressure to a workpiece or other member. Accordingly, it will be understood that the following description is made for illustrative purposes only.

Referring by way of example to high speed spot welding equipment commonly employed to spot weld work pieces on a mass production assembly line basis, such equipment typically comprises an actuating mechanism including a cylindrical housing having one end thereof suitably fixedly secured to a support, and a fluid pressure actuated piston member reciprocably disposed in such housing for movement between extended and retracted positions with respect to the latter and including a welding head projectable beyond the housing for engagement with the work pieces to be spot welded. The welding head, of course, includes the usual welding equipment which is adapted to be pressure-engaged with the workpieces during the spot welding operation. To this end, the work pieces are suitably conveyed to a station opposite the support for the actuating mechanism aforedescribed with the welding head of the latter disposed a certain relatively great distance from such pieces during the feeding action of the latter to the station in which the welding operation is to be performed. At this time, utilizing a suitable source of fluid under pressure and manually operably selector valve means under the control of the operator of the welding equipment, fluid under pressure is suitably supplied to the actuating mechanism to power the piston member thereof rapidly toward and against the work pieces to be welded. As a result, the welding head carried by the piston member is thrust outwardly from the housing and engages the workpieces with sufficiently high pressure engagement to satisfactorily conduct the welding operation. However, the impact between the aforementioned welding head and the workpieces is relatively severe often resulting in severe damage, at least after a number of cycles of operation of the actuating mechanism, to the welding head thereby necessitating repair or replacement of the latter, and often deforming the workpieces or otherwise causing a defective weld.

In view of the foregoing considerations, the present invention includes among its objects the provision of a pressure intensifier mechanism useable, for example, with high speed mass production welding equipment, and comprising a housing adapted to be mounted on a suitable support in a substantially fixed position relative to a member or members, such as two members to be spot welded together, to which is is desired to apply pressure, a first or take-up piston member mounted for reciprocation within said housing and including a head member at one end thereof projectable from the housing for engagement with the member or members to which pressure is to be applied, a second or intensifier piston member reciprocable relative to such housing and the first piston member, a substantially incompressible fluid contained within a chamber means defined in part by a working area carried by the first piston member and a working area carried by the second piston member, and control means selectively controlling reciprocation of the respective piston members whereby the first piston member may be initially reciprocated a relatively great distance to an extended position to engage with relatively light pressure the head member thereof with the member or workpieces to which it is desired to apply pressure, followed by reciprocation of the second piston member through a relatively slight distance to apply pressure through the fluid contained within the aforementioned chamber means to the working area associated with the first piston member to apply a relatively great pressure desired to be applied to the member or work pieces such as, for example, the desired pressure during a spot welding operation.

More specifically, it is yet another object and feature of this invention to provide a pressure intensifier mechanism of the type aforementioned wherein the aforementioned first piston member includes first and second fluid chambers and port means adapted to communicate such chambers for interchange of the aforementioned incompressible fluid therebetween during initial extension of the first piston member to engage the workpieces as aforedescribed, the second piston member being adapted to control the flow of such fluid through such port means and, in response to an initial predetermined amount of reciprocable movement thereof in a pressure intensifying direction, closing such port means to apply intensified pressure to the fluid contained within the aforementioned first chamber to apply the desired pressure between the head member of the first piston member and the member or workpieces which it engages.

It is yet another object and feature of this invention to provide control means including a source of motive fluid under pressure and selector valve means for controlling selective reciprocation of the aforementioned first and second piston members, such valve means being movable to a first position to supply such motive fluid to the first piston member to extend the latter out of the aforementioned housing, and being automatically movable to a second position in response to an increase in pressure in the motive fluid occasioned by initial engagement of the head member of the first piston member with the workpiece or other member to be engaged to supply such motive fluid to the second piston member to extend the latter and apply intensified pressure through the aforementioned incompressible fluid to the first piston member and the head member thereof.

These and other objects, features and advantages of the invention will appear more fully hereinafter as the description thereof proceeds, reference being made to the accompanying drawing in which:

FIGURE 1 is a longitudinal sectional view, partially schematic and diagrammatic in nature, taken along line 1—1 of FIGURE 4 and through a pressure intensifier mechanism illustrating a preferred embodiment of the invention, the mechanism being illustrated in a fully retracted position;

FIGURE 2 is a sectional view taken along line 2—2 of FIGURE 4 and further illustrating schematically a control mechanism for the intensifier mechanism, the latter being shown in a first stage position which it assumes upon initially engaging a member or members to which it is desired to apply pressure;

FIGURE 3 is a view corresponding generally to FIGURE 1, but illustrating the disposition of the various elements of the mechanism in a second stage thereof to apply the desired pressure to a member or members to which pressure is to be applied; and FIGURE 4 is a sectional view taken on line 4—4 of FIGURE 1.

Referring now to the drawings, the pressure intensifying mechanism indicated generally at 10 may be seen to be comprised of essentially three basic elements; that is, the cylindrical axially elongated housing 12, a first or take-up piston member 14 and a second or intensifier piston member 16.

More specifically, the housing 12 is adapted to be suitably removably fixably mounted on a suitable support 18, as by means of the threaded shank 20 extending from one end thereof, and further comprises a cylindrical internal bore 22, a circular bearing block or partition 24 coextensive with and suitably sealingly engaging the internal walls of the bore 22 and mounted fixedly relative to the housing 12 as by means of dowel pins 26 or the like, another circular bearing block or partition 28 axially spaced from the bearing block or partition 24 and similarly sealingly engaged in a fixed position within the bore 22 and further including a hollow cylindrical skirt 30 projecting axially toward and terminating just axially inwardly from the open end of the housing 12, and a circular bushing 32 suitably fixedly secured to the housing 12 as by the means 34 adjacent the terminal end of the skirt 30 and the aforementioned open end of the housing 12.

A pilot member indicated generally at 36 is suitably fixedly secured substantially centrally of the bore 22 of the housing and extends axially coincident thereto, and comprises a hollow cylindrical sleeve 38 having one end thereof suitably disposed centrally of the bearing block or partition 24, while the other end is suitably fixedly secured to an axially elongated pilot plug 40 projecting axially from the aforementioned open end of the housing. The plug 40 also includes a circular partition 42 and chamber 44 coaxial and communicating with sleeve 38 for a purpose to appear hereinafter.

The take-up or first piston member 14 comprises a hollow sleeve 46 coaxial with and surrounding the aforementioned sleeve 38 with slight radial clearance, indicated at 48, for reasons to appear more fully hereinafter, an annular flange 50 at one end thereof formed integral with an enlarged hollow cylindrical skirt portion 52 mounted for reciprocation within the bore of the skirt 30 and between the latter and partition 42, and a head member 54 suitably secured as by the dowel pins 56 to and closing one end of the hollow skirt portion 52, and reciprocably piloted about the pilot plug 40. The head member 54 is adapted to receive a conventional welding head or the like indicated in phantom at 58 for movement toward and away from one or more members also indicated in phantom at 60 such as workpieces to be spot welded, which the welding head 58 is to engage with a desired welding pressure. Key means 62 is suitably secured to the exterior of the hollow cylindrical skirt portion 52 of the first piston member for reciprocable confined movement within an axially elongated slot 64 in the skirt 30 to prevent relative rotation of the piston member 14 and the housing 12.

As aforementioned the hollow cylindrical skirt portion 52 of the piston member 14 is reciprocably piloted about the periphery of the partition 42 forming a part of the pilot member 36, such partition separating the hollow interior of the skirt 52 into first and second fluid chambers 66 and 68, respectively, on opposite sides thereof, and which are communicable through first and second ports 70 and 72 respectively communicating the first and second fluid chambers to the aforementioned chamber 44 in the plug 40. The chambers 44, 66 and 68 are almost completely filled with a suitable substantially incompressible fluid, such as oil, for purposes to appear more fully hereinafter. Furthermore, a free floating annular piston 74 is reciprocably disposed about the sleeve member 38 and within the bore of skirt 52, whereby some of the aforementioned fluid is confined between the floating piston and the partition 42 defining in part the second fluid chamber 68, again for reason to appear more fully hereinafter.

The first piston member 14 further includes a piston head 76 suitably fixedly secured adjacent one end of the sleeve 46, and being reciprocably disposed within a motor chamber 78 defined within the housing bore 22 between the partitions or bearing blocks 24 and 28. The motor chamber 78, to the right side of the piston head 76 as viewed in the drawings, is at all times in communication with the aforementioned floating piston 74, or the right side thereof as viewed in the drawings, through the flow passage formed by the radial clearance 48 aforedescribed between the fixed sleeve 38 and the sleeve 46 of the piston member 14, and also for a purpose to be described more fully hereinafter.

The second or intensifier piston member 16 comprises a piston head 80 mounted for reciprocation within a second motor chamber 82 formed within the housing bore 22 between the bearing block or partition 24 and the end of the housing adjacent the threaded shank 20, and has fixed thereto a relatively small diameter piston rod 84 extending axially therefrom through a suitable bore in the partition of bearing block 24, through the sleeve 38 and terminating in the end surface 86 disposed coaxially with and opposite the chamber 44.

Selective independent reciprocating of the first and second piston members 14 and 16 is controlled by a suitable system of fluid under pressure, in this case air under pressure, indicated schematically in the drawing and comprising the source of fluid under pressure 88 communicating with a suitable multi-position selector valve 90 having a return line 92 communicable to atmosphere or to a reservoir, depending upon whether or not the system is opened or closed as desired. The valve includes conventional porting respectively connected, as the conventional movable element of the valve is selectively shifted, through the conduit 94 to a port 96 communicating with the motor chamber 78 to the right side of the piston head 76, through the conduit 98 to a port 100 communicating with the motor chamber 82 to the right side of the intensifier piston head 80, and through the conduit 102 to a port 104 communicating with the motor chamber 78 on the opposite or left side of the piston head 76 of the take-up or first piston member 14. Of course, the valve also includes a fourth or neutral position preventing flow of fluid through any of the conduits 94, 98 and 102 aforedescribed. At this juncture, it should be noted that the valve 90 is of a conventional pressure responsive type wherein the shiftable valve element thereof is automatically movable from a first position communicating the source 88 through the valve to the conduit 94 to a second position communicating such source through the valve to the conduit 98 in response to a predetermined pressure increase in the motor chamber 78 as sensed through the conduit 94. Since such a valve construction is conventional, the details of the pressure responsive elements thereof are omitted in order not to obscure the invention.

In operation, it may be assumed that the pressure intensifier mechanism 10 is disposed as illustrated in FIGURE 1 prior to beginning a welding operation. At this time, the first and second piston members 14 and 16 thereof are fully retracted as illustrated in FIGURE 1 with the mechanism carried on its support 18 which is disposed opposite the station to which the member or members 60 may be placed or otherwise suitably conveyed in rapid succession according to mass production techniques. Assuming that the given workpieces or member 60 are disposed immediately opposite the welding head 58 associated with the mechanism 10, the operator of the mechanism will manipulate the valve 90 to supply fluid under pressure therethrough and through the conduit 94 to the motor chamber 78 and the right side of the piston head 76 forming a part of the first or take-up piston member 14. The pressure within such motor chamber then causes the entire first or take-up piston member 14 to reciprocate at a moderate speed toward the left from the position shown in FIGURE 1 to the position shown in FIGURE 2, at which time the welding head 58 initially and with relatively little or light impact engages the member or members 60. During movement of the first piston member as aforedescribed, the fluid under pressure supplied to the motor chamber 78 is also communicated through the clearance passage 48 to the right hand side of the floating piston 74 which is consequently urged to the left away from flange 50 of the first piston member for a slight distance until limited by compression of the fluid in chambers 44, 66 and 68, at which time it continues to travel in unison with the first piston member in spaced relation to the flange 50. As the piston member 14 so moves, the fluid contained within the second fluid chamber 68 is gradually transferred from the latter through the port means 72, chamber 44 and port means 70 to the first chamber 66. In other words, as the hollow cylindrical skirt portion 52 of the first piston member 14 reciprocates relative to the fixed partition 42, the relative volumes of the first and second fluid chambers 66 and 68 respectively increase and decrease transferring fluid therebetween.

Upon initial engagement of the welding head 58 with the member or members 60 as aforedescribed, the resistance to further extension of the first piston member 14 from housing 12 results in a predetermined pressure increase in the motor chamber 78 which is communicated through the conduit 94 to the valve 90 which automatically causes shifting of shiftable element thereof to interrupt communication with the motor chamber 78 and establish communication between the source 88, conduit 98 and the motor chamber 82. As a result, the second or intensifier piston member 16 begins to move to the left in FIGURE 2 and toward an extreme position as illustrated in FIGURE 3. During initial extension of such piston member 16, the end surface 86 of rod 84 thereof may tend to force a small amount of the fluid confined within the chamber 44 to flow through the port means 72 into the second fluid chamber 68, the floating piston 74 responsively moving slightly to the right from the position illustrated in FIGURE 2 back toward the flange 50 but still spaced appreciably therefrom to accommodate such flow of fluid. As the second piston member continues to move, the end of rod 84 closes the port 72 and the small diameter and working area of the end surface 86 thereof moves into the chamber 44 and applies intensified pressure to the fluid contained within such chamber and the chamber 66 through port 70, which intensified pressure acts upon the annular shoulders 106 and 108 formed on the head member 54 within chamber 66 and causes the first piston to be extended a final relatively small extent to apply pressure to the member or members 60 as indicated in FIGURE 3. During final extension of the piston member 14 in this manner, the volume of the fluid chamber 68 decreases slightly; that is, flange 50 of the piston member 50 moves a corresponding amount toward partition 42 and the floating piston 74 therebetween to a position such as illustrated in FIGURE 3. Thus, the floating piston prevents lock-up of fluid in chamber 68 and of piston member 14 during such final movement of the latter. Preferably, the effective area of the shoulders 106 and 108 in many times greater than the effective area of the end surface 86 of the rod 84, thereby providing the intensified force required.

The welding operation is then conducted and, upon termination thereof, the valve 90 is manipulated to communicate the fluid source 88 through a conduit 102 to the motor chamber 78 on the left side of the piston head 76 associated with the first or take-up piston member 14. As a result, such piston member moves to the right from the position of FIGURE 3 back toward the retracted position of FIGURE 1, during which movement the fluid entrapped within the first fluid chamber 66 and the chamber 44, under the influence of the effective working area of the shoulders 106 and 108 of the head member 54, acts against the end surface 86 of the piston rod 84 resulting in the second piston member 16 moving also to the right in substantial unison with the first piston member. The piston members continue to move to the right toward the retracted positions of FIGURE 1 until such time as the head end of the rod 84 of the second or intensifier piston member 16 again opens the port means 72 as illustrated in FIGURE 1, at which time continued movement of the first piston member 14 to the right results in flow of fluid from the chamber 44 through the port means 72 into the second fluid chamber 68 to move the floating piston 74 to its extreme rightward position as illustrated in FIGURE 1.

Therefore, it may be seen that a pressure intensifier mechanism constructed in accordance with the present invention includes a first stage of operation in which the first or take-up piston member 14 is operable to move the welding head 58 through the distance necessary to engage such head with the member or members 60 to be spot welded and to engage such members with relatively light pressure and relatively small impact if any at all. Thereafter, the desired welding pressure may be applied gently and with practically no impact, relatively speaking, by operation of the second or intensifier piston as aforedescribed.

While but one form of the invention has been shown as described, other forms will now be apparent to those skilled in the art. Therefore, it is to be understood that the embodiment shown in the drawing and described above is merely for illustrative purposes, and is not intended to limit the scope of the invention which is defined by the claims which follow.

What is claimed is:

1. A pressure intensifier mechanism comprising a housing, first piston means mounted for reciprocation within said housing for movement between retracted and extended positions and being engageable with a member to which pressure is to be applied, means including said first piston means defining a pressure chamber and a reservoir chamber respectively having variable volumes as said first piston means moves between said positions thereof, a substantially incompressible fluid confined within said chambers, second piston means mounted for reciprocation within said housing for movement independently of said first piston means between retracted and extended positions, means communicating said chambers for flow of said fluid from said reservoir chamber to said pressure chamber in response to movement of said first piston means to said extended position thereof and preventing flow between said chambers in response to movement of said second piston means to said extended position thereof, said second piston means in said extended position thereof applying pressure to said fluid within said pressure chamber and to said first piston means to force the latter against the member to which pressure is to be applied, and control means selectively controlling movement of said first and second piston means between said respective positions thereof.

2. The pressure intensifier mechanism as defined in claim 1 further comprising first and second motor chambers within said housing, said first and second piston means being respectively reciprocably mounted within said first and second motor chambers, and wherein said control means comprises a source of motive fluid under pressure, means including selector valve means operable to selectively communicate said source to said first and second motor chambers, said valve means having a first position communicating said source to said first motor chamber to move said first piston means toward said extended position thereof, and a second position communicating said source to said second motor chamber to move said second piston means toward said extended position thereof, a free floating piston member reciprocably disposed within said reservoir chamber and having one side thereof acted upon by the pressure of said fluid confined therewithin, and means communicating the other side of said piston member to said first motor chamber whereby, with said valve means in said first position thereof, motive fluid is supplied to said piston member to move the latter relative to and in the direction of extension of said first piston means and, with said valve means in said second position thereof, being movable in the opposite direction and relative to movement of said first piston means toward said extended position thereof during movement of said second piston means toward said extended position thereof.

3. The pressure intensifier mechanism as defined in claim 1 wherein movement of said first piston means from said extended position to said retracted position thereof applies pressure to said fluid confined within said pressure chamber and to said second piston means in said extended position thereof to move the latter towards said retracted position thereof.

4. A pressure intensifier mechanism comprising a housing, first piston means mounted for reciprocation within said housing for movement between retracted and extended positions and being engageable with a member to which pressure is to be applied, means including said first piston means defining a pressure chamber, means defining a reservoir chamber, a substantially incompressible fluid confined within said chambers, second piston means mounted for reciprocation within said housing for movement independently of said first piston means between retracted and extended positions, means communicating said chambers for flow of said fluid from said reservoir chamber to said pressure chamber in response to movement of said first piston means to said extended position thereof and preventing flow between said chambers in response to movement of said second piston means to said extended position thereof, said second piston means in said extended position thereof applying pressure to said fluid within said pressure chamber and to said first piston means to force the latter against the member to which pressure is to be applied, first and second motor chambers within said housing, said first and second piston means being respectively reciprocably mounted within said first and second motor chambers, a free floating piston member reciprocably disposed within said reservoir chamber and having one side thereof acted upon by the pressure of said fluid confined therewithin, means communicating the other side of said piston member to said first motor chamber, a source of motive fluid under pressure, and selector valve means operable to selectively communicate said source to said first and second motor chambers respectively.

5. A pressure intensifier mechanism comprising a housing, first piston means mounted for reciprocation within said housing for movement between retracted and extended positions and being engageable with a member to which pressure is to be applied, means including said first piston means defining first and second fluid chambers of variable volumes in response to movement of said first piston means between said positions thereof, a substantially incompressible fluid confined within said chambers, port means adapted to communicate said chambers whereby said fluid tends to flow from said first fluid chamber through said port means to said second fluid chamber in response to movement of said first piston means toward said retracted position thereof, and from said second fluid chamber through said port means to said first fluid chamber in response to movement of said first piston means toward said extended position thereof, second piston means mounted for reciprocation within said housing for movement independently of said first piston means between retracted and extended positions and relative to said port means to control the flow of said fluid therethrough said second piston means upon movement thereof to an initial predetermined extent towards said extended position thereof closing said port means and applying pressure to said fluid confined within said first fluid chamber and to said first piston means to force the latter against the member to which pressure is to be applied, said first piston means upon movement toward said retracted position thereof applying pressure to said fluid confined within said first fluid chamber and to said second piston means to move the latter toward said retracted position thereof in substantial unison with the first piston means until said second piston means opens said port means for flow of fluid from said first fluid chamber to said second fluid chamber, and control means selectively controlling movement of said first and second piston means between said respective positions thereof.

6. The pressure intensifier mechanism as defined in claim 5 further comprising key means cooperable between said housing and said first piston means to prevent relative rotation therebetween.

7. The pressure intensifier mechanism as defined in claim 5 further comprising first and second motor chambers within said housing, said first and second piston means being respectively reciprocably mounted within said first and second motor chambers, and wherein said control means comprises a source of motive fluid under pressure, means including selector valve means operable to selectively communicate said source to said first and second motor chambers, said valve means having a first position communicating said source to said first motor chamber on one side of said first piston means to move the latter toward said extended position thereof, a second position communicating said source to said second motor chamber to move said second piston means toward said extended position thereof, and a third position communicating said source to said first motor chamber on an opposite side of said first piston means to move the latter toward said retracted position thereof.

8. The pressure intensifier mechanism as defined in claim 7 further comprising a free floating piston member reciprocably disposed within said second fluid chamber and having one side thereof acted upon by the pressure of said fluid confined within said second fluid chamber, and means communicating the other side of said piston member to said first motor chamber on said one side of said first piston means whereby, with said valve means in said first position thereof, motive fluid is supplied to said piston member to move the latter relative to and in the direction of extension of said first piston means and, with said valve means in said second position thereof, said piston member is movable in the opposite direction and relative to movement of said first piston means toward said extended position thereof during movement of said second piston means toward said extended position thereof.

9. The pressure intensifier mechanism as defined in claim 7 wherein said valve means is movable automatically from said first position to said second position thereof in response to a predetermined increase in pressure in said first motor chamber upon said first piston means engaging said member to which pressure is to be applied.

10. A pressure intensifier mechanism comprising a housing, first piston means mounted for reciprocation within said housing for movement between retracted and extended positions and including a head member projecting from said housing for engagement with a member to which pressure is to be applied, means defining first and second fluid chambers internally of said first piston means, the respective volumes of said chambers being variable in response to movement of said first piston means between said positions thereof, a substantially incompressible fluid confined within said chambers, port means adapted to communicate said chambers whereby said fluid tends to flow from said first fluid chamber through said port means to said second fluid chamber in response to movement of said first piston means toward said retracted position thereof, and from said second fluid chamber through said port means to said first fluid chamber in response to movement of said first piston means toward said extended position thereof, second piston means mounted for reciprocation within said housing for movement independently of said first piston means between retracted and extended positions and relative to said port means to control the flow of said fluid therethrough, said second piston means in said retracted position thereof opening said port means and upon movement to an initial predetermined extent toward said extended position thereof closing said port means and applying pressure to said fluid confined within said first fluid chamber and to said first piston means to force said head member thereof against the member to which pressure is to be applied, said first piston means upon movement toward said retracted position thereof applying pressure to said fluid confined within said first fluid chamber and to said second piston means in said extended position of the latter to move said second piston means toward said retracted position thereof in substantial unison with said first piston means until said second piston means opens said port means for flow of fluid from said first fluid chamber to said second fluid chamber, and control means selectively controlling movement of said first and second piston means between said respective position thereof.

11. A pressure intensifier mechanism comprising a housing adapted to be held in a substantially fixed position relative to a member to which pressure is to be applied a first piston member mounted for reciprocation within said housing for movement between retracted and extended positions and including a head member at one end thereof projectable from said housing for engagement with the member to which pressure is to be applied, said first piston member including a hollow cylindrical portion having a fluid pressure working area adjacent said one end thereof, partition means fixed relative to said housing and cooperable with said hollow cylindrical portion of said first piston member to separate the latter into a first fluid chamber between one side of said partition means and said working area and a second fluid chamber on the other side of said partition means, a substantially incompressible fluid confined within said chambers, said partition means including port means adapted to communicate said chambers whereby said fluid tends to flow from said first fluid chamber through said port means to said second fluid chamber in response to movement of said first piston member towards said retracted position thereof, and from said second fluid chamber through said port means to said first fluid chamber in response to movement of said first piston member toward said extended position thereof, a second piston member mounted for reciprocation within said housing for movement independently of said first piston member between retracted and extended positions and relative to said port means to control the flow of said fluid therethrough and including a fluid pressure working area exposed to said fluid in said first fluid chamber, said second piston member in said retracted position thereof opening said port means to communicate said fluid chambers for flow of said fluid therebetween and upon reciprocation thereof to an initial predetermined extent toward said extended position thereof closing said port means whereby said working area thereof applies pressure to said fluid confined within said first fluid chamber and to said working area of said first piston member to force said head member of the latter against the member to which pressure is to be applied, said working area of first piston member upon movement of the latter form said extended position to said retracted position thereof applying pressure to said fluid confined within said first fluid chamber and said working area of said second piston member in said extended position of the latter to move said second piston member to said retracted position thereof in substantial unison with said first piston member to open said port means for flow of fluid from said first fluid chamber to said second fluid chamber, and control means selectively controlling movement of said first and second piston members between said respective positions thereof.

12. The pressure intensifier mechanism as defined in claim 11 further comprising key means cooperable between said housing and said first piston member to prevent relative rotation therebetween.

13. The pressure intensifier mechanism as defined in claim 11 further comprising first and second motor chambers within said housing, said first and second piston members respectively including piston heads reciprocably disposed within said first and second motor chambers, and wherein said control means comprises a source of motive fluid under pressure, means including selector valve means operable to selectively communicate said source to said first and second motor chambers, said valve means having a first position communicating said source to said first motor chamber on one side of said piston head of said first piston member to reciprocate the latter toward said extended position thereof, a second position communicating said source to said second motor chamber on one side of said piston head of said second piston member to reciprocate the latter toward said extended position thereof, and a third position communicating said source to said first motor chamber on the other side of said piston head of said first piston member to reciprocate the latter toward said retracted position thereof.

14. The pressure intensifier mechanism as defined in claim 13 further comprising a free floating piston member reciprocably disposed within said second fluid chamber and having one side thereof acted upon by the pressure of said fluid confined within said second fluid chamber, and means communicating the other side of said free floating piston to said first motor chamber on said one side of said piston head of said first piston member whereby, with said valve means in said first position thereof, motive fluid is supplied to said floating piston member to move the latter relative to and in the direction of extension of said first piston member and, with said valve means in said second position thereof, said floating piston member is movable in the opposite direction and relative to movement of said first piston member toward said extended position thereof during movement of said second piston member toward said extended position thereof.

15. The pressure intensifier mechanism as defined in claim 13 wherein said valve means is movable automatically from said first position to said second position thereof in response to a predetermined increase in pressure in said first motor chamber upon said head member of said first piston member initially engaging said member to which pressure is to be applied.

References Cited by the Examiner

UNITED STATES PATENTS

| 825,301 | 7/1906 | Coddington | 60—54.5 X |
| 1,940,304 | 12/1933 | Jackson | 60—54.5 |
| 2,452,292 | 10/1948 | Cousino | 60—54.5 |
| 2,608,059 | 8/1952 | Kux | 60—54.5 |
| 2,829,499 | 4/1958 | Ferguson | 60—54.5 |
| 2,840,044 | 6/1958 | Carrion | 91—31 |
| 2,867,088 | 1/1959 | Kux | 60—54.5 |

FOREIGN PATENTS

| 921,865 | 1/1947 | France. |
| 929,959 | 7/1947 | France. |
| 560,678 | 4/1944 | Great Britain. |

MARTIN P. SCHWADRON, *Primary Examiner.*

ROBERT R. BUNEVICH, *Examiner.*